United States Patent [19]

Fukui

[11] 4,212,853

[45] Jul. 15, 1980

[54] METHOD FOR THE TREATMENT OF EXHAUST GASES CONTAINING NITROGEN OXIDES

[75] Inventor: Suguru Fukui, Tokyo, Japan

[73] Assignee: Chiyoda Kako Kensetsu Kabushiki Kaisha, Yokohama, Japan

[21] Appl. No.: 973,702

[22] Filed: Dec. 27, 1978

Related U.S. Application Data

[63] Continuation-in-part of Ser. No. 780,406, Mar. 23, 1977, which is a continuation-in-part of Ser. No. 663,198, Mar. 2, 1976, abandoned, which is a continuation of Ser. No. 504,110, Sep. 9, 1974, abandoned.

[30] Foreign Application Priority Data

Sep. 7, 1973 [JP] Japan .................................. 48/100318

[51] Int. Cl.$^2$ ............................................. B01D 53/34
[52] U.S. Cl. .................................................... 423/235
[58] Field of Search ................................. 423/235, 351

[56] References Cited

U.S. PATENT DOCUMENTS

| 3,528,797 | 9/1970 | Funk et al. ............................ 423/235 |
| 3,565,575 | 2/1971 | Warshaw ............................... 423/235 |
| 3,801,696 | 4/1974 | Mark ..................................... 423/235 |

FOREIGN PATENT DOCUMENTS

| 48-1296 | 1/1973 | Japan ....................................... 423/235 |
| 186985 | 11/1966 | U.S.S.R. ................................... 423/235 |

*Primary Examiner*—G. O. Peters
*Attorney, Agent, or Firm*—Armstrong, Nikaido, Marmelstein & Kubovcik

[57] ABSTRACT

Exhaust or waste gas containing nitrogen oxides is contacted with an aqueous solution containing urea and a catalytic amount of bromine or/and chlorine ion.

12 Claims, 2 Drawing Figures

METHOD FOR THE TREATMENT OF EXHAUST GASES CONTAINING NITROGEN OXIDES

This application is a continuation-in-part application of application Ser. No. 780,406 filed Mar. 23, 1977, which is a continuation-in-part application of application Ser. No. 663,198 filed Mar. 2, 1976, which, in turn, is a continuation application of application Ser. No. 504,110 filed Sept. 9, 1974 both abandoned.

BACKGROUND OF THE INVENTION

1. Field of the Invention

The present invention relates to a method for treating exhaust gases containing nitrogen oxides, such as exhaust gases resulting from the combustion of various petroleum fuels and fossil fuels, as well as waste gases from nitric acid manufacturing plants and pickling plants, for the effective removal of the nitrogen oxides. More particularly, it relates to a chemical treatment of such exhaust gases wherein exhaust gas is treated with neutral or acidic aqueous solutions of urea in the presence of a selected catalyst.

2. Description of the Prior Art

Exhaust gases resulting from the combustion of petroleum fuels such as crude oil, heavy oil, light oil, kerosene, light distillate, LPG and LNG, and of fossil fuels such as coal, usually contain about 10 to 1,000 ppm of nitrogen oxides. Waste gases from nitric acid manufacturing plants and pickling plants normally contain several thousands or more ppm of nitrogen oxides. When these amounts of nitrogen oxides are released into the atmosphere, they can cause serious pollution problems.

Various methods have heretofore been proposed to remove the nitrogen oxides from the exhaust or waste gases containing the same. These methods may roughly be classified as "dry" and "wet" methods.

Known dry methods include, for example, selective reduction wherein the nitrogen oxides are selectively reduced in the presence of a suitable catalyst with a reducing agent such as ammonia; non-selective reduction wherein the nitrogen oxides are reduced with a reducing agent such as hydrogen, carbon monoxide, methane or the like; adsorption wherein the nitrogen oxides are adsorbed with a suitable adsorbent such as active carbon, and catalytic decomposition wherein the nitrogen oxides are decomposed through the use of a suitable catalyst.

The known method, however, based on the selective reduction of nitrogen oxides involves disadvantages such as poisoning of the catalyst by sulfur oxides, plugging of the catalyst bed by dust contained in the combustion exhaust gas, the emitting of a considerable amount of the reducing agent with the treated exhaust gas and a low percentage of removal of the nitrogen oxides. The method, therefore, has not yet been practiced commercially. The method based on non-selective reduction has similar disadvantages. Additionally, the reducing agent may be consumed by oxygen contained in the exhaust gas. Accordingly, this method is also impractical. The known method based on adsorption involves such problems that a satisfactory adsorption capacity cannot be obtained with any of the known adsorbents and that components other than nitrogen oxides in the exhaust gas may often be adsorbed preferentially. With respect to the method based on the catalytic decomposition of nitrogen oxides, no satisfactory catalysts have been found.

As to the wet methods, various methods have been proposd in which exhaust or waste gas is contacted with an aqueous solution containing various adsorbents, such as alkalis and acids. Because of a low reactivity of the nitrogen oxides, however, the attainable absorption efficiency is generally low. Regeneration of the spent absorbent is required and makes the process complicated. Furthermore, a problem with respect to the treatment or disposal of the by-products is involved. For these reasons and others, none of the known wet processes has been commercially practiced for the treatment of large amounts of combustion exhaust gases.

Accordingly, it is a primary object of the present invention to provide a method for the treatment of exhaust or waste gases containing nitrogen oxides and originating from various sources, which method is extremely simple, effective and economical for the removal of the nitrogen oxides.

SUMMARY OF THE INVENTION

According to the present invention, it has now been found that when exhaust or waste gas containing nitrogen oxides is contacted with an aqueous solution containing urea and at least one halogen ion selected from the group consisting of bromine ion and chlorine ion, the nitrogen oxides are effectively reacted with the urea and converted to non-toxic compounds such as nitrogen, carbon dioxide and water.

In one embodiment according to the present invention, the exhaust or waste gas is contacted with a neutral aqueous solution containing urea and a catalytic amount of at least one halogen ion selected from the group consisting of bromine and chlorine ions at a temperature of between about the ambient temperature and the boiling point of the neutral solution.

In another embodiment according to the present invention, the exhaust or waste gas is contacted with an acidic aqueous solution containing urea and a catalytic amount of halogen ion selected from the group consisting of bromine ion and mixtures of bromine and chlorine ions at a temperature of between about the ambient temperature and the boiling point of the acidic solution.

In this invention the inventor defines the terms "neutral solution" and "acidic solution" as hereinbefore stated as follows: by the term "neutral solution" is meant a solution which is obtained by dissolving in water urea and a halogen compound of the type used in the process of this invention without adding an acid component to said solution or without accompanying the hydrolysis of said halogen compound added which may newly form an acid component as a result, while by the term "acidic solution" is meant a solution which is obtained by dissolving in water urea and a halogen compound of the type used in the process of this invention with the addition of an acid component thereto or accompanying the new formation of an acid component as a result of the hydrolysis of said halogen compound added.

In still another embodiment according to the present invention, the exhaust or waste gas is contacted with an acidic aqueous solution containing urea, hydrochloric acid, and a catalytic amount of chlorine ions other than the chlorine ions forming said hydrochloric acid at a temperature of between about ambient temperature and the boiling point of the solution.

Methods for the removal of nitrogen oxides from gases containing the same with an acidic aqueous solution of urea are disclosed in U.S. Pat. No. 3,565,575 to A. Warshaw and No. 3,528,797 to A. B. Funk et al. U.S. Pat. No. 3,565,575 relates to treatment of waste gas from nitric acid manufacturing plants and U.S. Pat. No. 3,528,797 to treatment of waste gas from the acidulation of phosphate rock with nitric acid. In these processes an aqueous solution of urea acidified with an inorganic or organic acid is used. These processes were studied and as the result it was found that in these processes the efficiency of treatment is so low that they can hardly be actually put into industrial practice as the current process for treating exhaust gases wherein it is required to treat them in high rates of denitrification until an extremely low concentration is reached. Thus, using a countercurrent contact tower of 20 plates, exhaust gases containing 100 to 600 ppm of nitrogen oxides with various $NO/NO_2$ ratios were treated with various acidic aqueous solutions containing from about 0.01 to 30% by weight of urea and up to 10% by weight of sulfuric or nitric acid. In all cases, the percentage removal of nitrogen oxides was at most about 40%. Therefore, in order to remove a higher percentage of nitrogen oxides with these processes in industrial practice, the use of massive installation, smaller rates of flow of liquid and gas, and larger ratios of liquid to gas are necessary. All of these factors make the process impractical.

In Japanese patent application Ser. No. 24,963/75 filed Mar. 3, 1975, by the assignee of the invention herein, an exhaust gas containing $NO_x$ is denitrated by contacting it with an acidic aqueous solution containing ammonia in which bromine and/or chlorine ions are employed as a catalyst. The nitrogen oxides are converted into nitrogen gas and water as a result of the reaction between the nitrogen oxides and ammonia. The concentration of ammonia may be less than that of a saturated solution and the concentration can keep the pH of the solution below about 7. A suitable concentration is selected according to the concentration of the $NO_x$ in the gas to be treated, the type and concentration of the acid employed, the specific halogen catalyst employed and its concentration and the pH of the solution. The concentration of the bromine and/or chlorine ions may be less than that required for a saturated solution.

DESCRIPTION OF PREFERRED EMBODIMENTS

It has now been found according to the present invention that if minor amounts of bromine or chlorine ion are added to a treating solution containing urea, the removal of nitrogen oxides is markedly increased. For example, by adding KBr to an acidic urea-containing treating solution, the KBr being employed in an amount of 1% by weight or less, the removal of nitrogen oxides is increased from about 40% or less to about 55–70%. Various compounds of neutral salt containing chlorine ion are also highly effective in enhancing the rate of denitrification as clearly seen from the comparison of, for example, Example IV and Comparative Example in Example III. The improvement of the removal of the nitrogen oxides has been determined to be due to the action of the added bromine ion or chlorine ion.

It has also been determined according to the present invention that the presence of acid in the treating solution containing the said halogen ion or ions is not critical.

Figure 1:
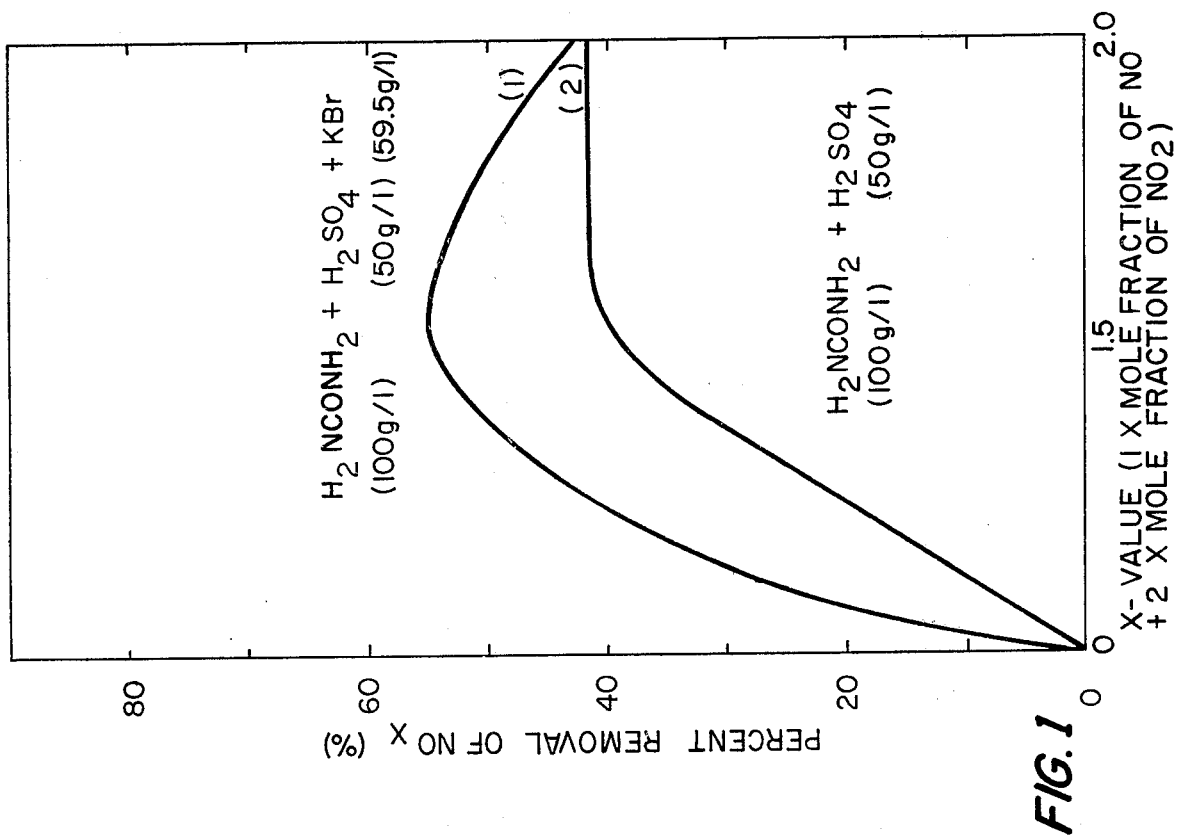
Figure 2:
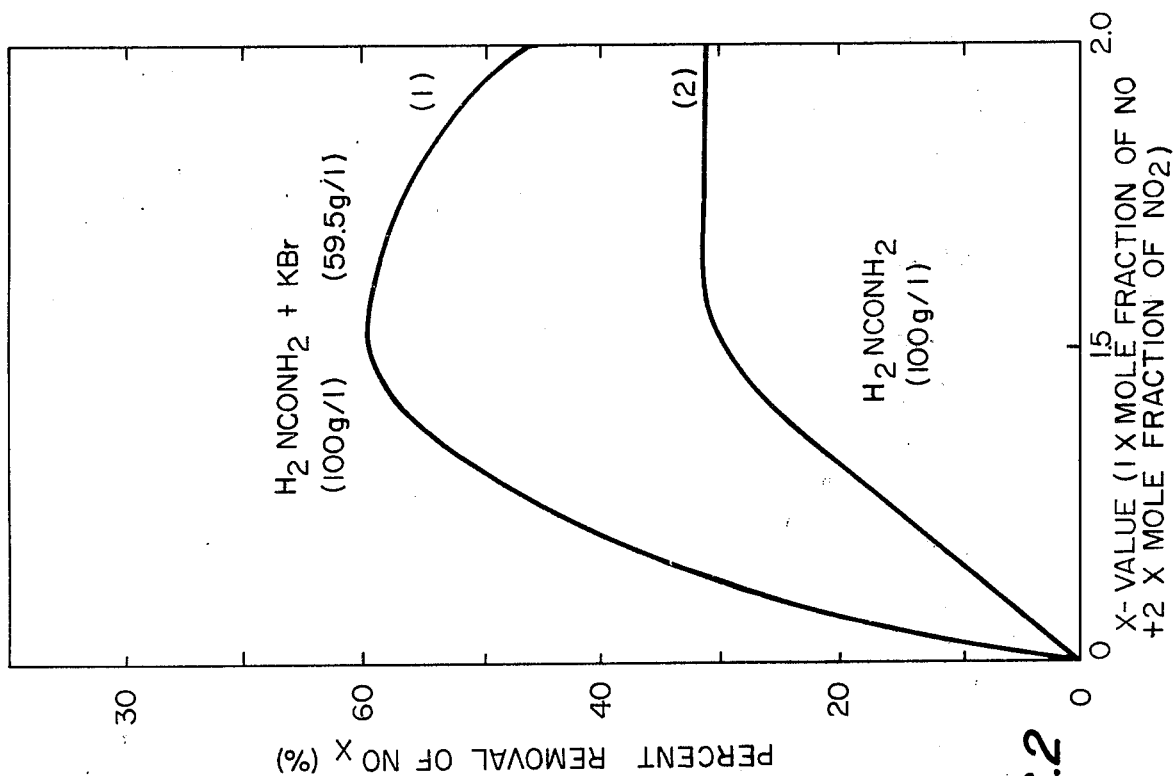

The effect of the addition of halogen ions to a treating solution containing urea in accordance with the present invention is illustrated by the accompanying drawings, in which:

FIG. 1 is a graph showing the results (percent removal of nitrogen oxides) obtained when exhaust gases containing 300 ppm of nitrogen oxides with various $NO_2/NO$ ratios were treated with two acidic aqueous solutions of urea, one containing KBr and the other not containing KBr, with all other conditions being the same, and FIG. 2 is a graph showing the results (percent removal of nitrogen oxides) obtained when exhaust gases containing 300 ppm of nitrogen oxides with various $NO_2/NO$ ratios were treated with two neutral aqueous solutions of urea, one containing KBr and the other not containing KBr, with all other conditions being the same.

As shown by the comparison of FIGS. 1 and 2, in the treating solution containing halogen ion or ions in accordance with the process of this invention the addition of an acid is not always necessary. Further, in U.S. Pat. No. 3,565,575 to A. Warshow et al. there is described a process wherein an aqueous solution of urea is used as an acidic aqueous solution by adding thereto an acid, and hydrochloric acid is mentioned as one of the acids to be added, together with sulfuric acid, nitric acid, and acetic acid. But the present inventor found that when a neutral salt compound containing chlorine ion, for example, NaCl, is added to an aqueous solution of urea obtained by adding hydrochloric acid to an aqueous solution of urea the rate of denitrification is still further improved than is the case with a mere hydrochlorinated aqueous solution of urea. And it is also found that when a neutral salt compound containing bromine ion, for example, KBr, is added to an aqueous solution of urea acidified with bromic acid, the demitrification shows the same results. That is to say, by further adding to an aqueous solution of urea acidified with a strong mineral acid, chlorine ion or bromine ion or a mixture of salts containing these halogen ions besides the ions forming said hydrohalogenic acid it is possible to far much enhance the rate of denitrification.

As described above, a neutral aqueous solution of urea containing bromine and/or chlorine ion, or an acidic aqueous solution of urea containing bromine ion or a mixture of bromine and chlorine ions is employed in the method according to the present invention. Of these halogen ions, the bromine ion gives the best results. With respect to other halogen ion, fluorine ion has been found to be less effective and iodine ion ineffective for the purposes of the invention.

The aqueous solutions of urea employed in the practice of this invention should contain sufficient urea to convert the nitrogen oxides contained in the gas to be treated to non-toxic compounds. The upper limit of the concentration of urea is not critical. Although the optimum concentration of urea will vary depending upon the $NO_x$ content of the gas to be treated, an aqueous solution containing about 0.01 to about 30% by weight of urea may generally be used. For the treatment of combustion exhaust gases containing several hundreds ppm of nitrogen oxides, even a concentration of urea as low as 1% by weight or less is well effective.

The concentration of the halogen ion in the treating solutions is also not critical. The treating solution of urea may contain from a catalytic amount to the saturated amount of halogen ion. Typically, at least 0.01 gram ion/liter and, preferably, 0.1 gram ion/liter or more of the halogen ion is present in the treating solution.

Any inorganic or organic halogen compounds that will release bromine or chlorine ion in an aqueous solution may be used as the source of the halogen ion. Examples of such compounds include alkali metal bromines and chlorides such as sodium, potassium and lithium bromide and chloride; compounds of bromine and/or chlorine with various elements including Be, B, Mg, Al, Si, P, Ca, Sc, Ti, V, Cr, Mn, Fe, Co, Ni, Cu, Zn, Ga, Ge, As, Se, Rb, Sr, Y, Zr, Nb, Mo, Tc, Ru, Rh, Pd, Ag, Cd, In, Sn, Sb, Te, Cs, Ba, Hf, Ta, W, Re, Os, Ir, Pt, Au, Hg, Tl, Pb, Bi, Po, At, Pr, Ra, Ac, Th, Pa, U and rare earth elements, the halides of which will release bromine or chlorine ion in an aqueous solution; HBr; $NH_4X$ where X is Br or Cl; $R_4NX$ where each R is identical or different and is an organic radical, and X is Br or Cl; R—X in which R is an organic radical and X is Br or Cl; $SOX_2$ in which X is Br or Cl; and $SO_2X_2$ in which X is Br or Cl.

As described above the treating solution urea containing halogen ion or ions may be either acidic or neutral.

The treatment in accordance with the present invention may be carried out at ambient temperature or at elevated temperatures up to about the boiling point of the treating solution.

It has been determined according to the present invention that best results can be obtained when the gas to be treated contains nitrogen oxides in an $NO_2/NO$ ratio of about 1. Accordingly, when a gas containing nitrogen oxides of an $NO_2/NO$ ratio of less than 1 is to be treated, it is preferred to partially oxidize the gas to increase the $NO_2/NO$ ratio to about 1 prior to contacting the gas with the treating solution.

The method of this invention is applicable to the treatment of various gases containing $NO_2$ in a practical amount as one component of nitrogen oxides and containing nitrogen oxides in enviromentally significant amounts of from several tens ppm to several tens %. These include gases from the combustion of various fuels, and waste gases from nitric acid manufacturing and pickling plants.

When a gas containing nitrogen oxides is treated according to the method of this invention, the nitrogen oxides react with the urea present in the treating solution to form non-toxic compounds such as nitrogen, carbon dioxide and water. The halogen ion present in the treating solution acts as a catalyst and eventually remains in the solution without forming any reaction product. Accordingly, the halogen ion is not consumed.

Advantages of the method of the invention are listed below:

(1) The nitrogen oxides contained in the treated gas are effectively removed or converted to non-toxic compounds through the reaction with urea by the catalytic action of the halogen ion. Accordingly, when compared with the processes of the above-mentioned United States patents, the method of the invention operates more efficiently and may be practiced with smaller or more compact apparatus.

(2) The nitrogen oxides react with urea to form non-toxic $N_2$, $CO_2$ and $H_2O$. By-products the treatment or disposal of which create serious problems are not formed.

(3) The method of the invention does not require the regeneration of the treating agent as is required in the currently proposed methods, i.e., the absorption methods with acid or alkali, and the oxidation-absorption method. Thus, the method of the invention may be practiced with simple procedures and apparatus involving only gas-liquid contact.

The invention will be further described by the following non-limitative examples, in which nitrogen oxides were determined by chemiluminescence analysis.

EXAMPLE I

Using an OLDERSHAW type column of 20 perforated trays, combustion gases containing 300 ppm of nitrogen oxides with various $NO_2/NO$ ratios were counter-currently treated with an aqueous solution containing 100 g/liter of urea, 50 g/liter of sulfuric acid, and 59.5 g/liter of potassium bromide at a temperature of 50° C. The rate of flow of the liquid was 0.50 liter/hr, while the rate of flow of the gas was 50 N liter/hr. The results obtained are shown in FIG. 1 as curve (1). At an $NO_2/NO$ ratio of 1.0, the percent removal of nitrogen oxides is 55.0 %.

For comparison purposes, the above procedure was repeated except that the treating liquid was replaced by an aqueous solution containing 100 g/liter of urea and 50 g/liter of sulfuric acid, with the other conditions remaining the same. The results obtained are shown in FIG. 1 as curve (2). At an $NO_2/NO$ ratio of 1.0 the percent removal of nitrogen oxides is 39.0%.

EXAMPLE II

Following the procedure described in Example I, an exhaust gas containing 300 ppm of nitrogen oxides with an $NO_2/NO$ ratio of 1.0 was treated with an aqueous solution containing 100 g/liter of urea and 38 g/liter of HBr. The percent removal of nitrogen oxides was 59.5%.

EXAMPLE III

Following the procedure described in Example I, an exhaust gas containing 300 ppm of nitrogen oxides with an $NO_2/NO$ ratio of 1.0 was treated with an aqueous solution containing 100 g/liter of urea and 59.5 g/liter of KBr. The percent removal of nitrogen oxides was 60.0%.

For comparison purposes, the above procedure was repeated except that the treating liquid was replaced by an aqueous solution containing 100 g/liter of urea alone, with the other conditions remaining the same. The percent removal of nitrogen oxides was only 29.5%.

EXAMPLE IV

Following the procedure of Example I, an exhaust gas containing 300 ppm of nitrogen oxides with an $NO_2/NO$ ratio of 1.0 was treated with an aqueous solution containing 100 g/liter of urea and 29 g/liter of NaCl. The percent removal of nitrogen oxides was 41.2%.

Following the procedure described in Example I, an exhaust gas containing 300 ppm of nitrogen oxides with an $NO_2/NO$ ratio of 1.0 was treated with an aqueous solution containing 100 g/liter of urea and 27.0 g/liter of $FeCl_2$. The percent removal of nitrogen oxides was 41.3%.

EXAMPLE V

Following the procedure described in Example I, an exhaust gas containing 3,700 ppm of nitrogen oxides with an $NO_2/NO$ ratio of 1.0 was treated with an aqueous solution containing 100 g/liter of urea, 50 g/liter of sulfuric acid and 59.5 g/liter of KBr. The percent removal of nitrogen oxides was 84.2%.

For comparison purposes, the above procedure was repeated except that the treating liquid was replaced by an aqueous solution containing 100 g/liter of urea and 50 g/liter of sulfuric acid, with the other conditions remaining the same. The present removal of nitrogen oxides was 59.6%.

EXAMPLE VI

Following the procedure described in Example I, exhaust gases containing 300 ppm of nitrogen oxides with various $NO_2/NO$ ratios were treated with an aqueous solution containing 100 g/liter of urea and 59.5 g/liter of KBr. The results obtained are shown in FIG. 2 as curve (1).

For comparison purposes, the above procedure was repeated except that the treating liquid was replaced by an aqueous solution containing 100 g/liter of urea alone, with the other conditions remaining the same. The results obtained are shown in FIG. 2 as curve (2).

EXAMPLE VII

Following the procedure described in Example I, an exhaust gas containing 300 ppm of the nitrogen oxides with an $NO_2/NO$ ratio of 1.2 was treated with an aqueous solution containing 100 g/liter of urea and 11.9 g/liter of KBr. The percent removal of nitrogen oxides was 59.0%.

EXAMPLE VIII

Following the procedure described in Example I, an exhaust gas containing 300 ppm of nitrogen oxides with an $NO_2/NO$ ratio of 1.2 was treated with an aqueous solution containing 1 g/liter of urea and 59.5 g/liter of KBr. The percent removal of nitrogen oxides was 64.0%.

EXAMPLE IX

Following the procedure described in Example I, an exhaust gas containing 300 ppm of nitrogen oxides with an $NO_2/NO$ ratio of 1.2 was treated with an aqueous solution containing 100 g/liter of urea and 51.5 g/liter of NaBr. The percent removal of nitrogen oxides was 59.8%.

EXAMPLE X

Following the procedure described in Example I, an exhaust gas containing 300 ppm of nitrogen oxides with an $NO_2/NO$ ratio of 1.2 was treated with an aqueous solution containing 10 g/liter of urea and 37 g/liter of $MgBr_2$. The percent removal of nitrogen oxides was 62.9%.

EXAMPLE XI

Following the procedure described in Example I, an exhaust gas containing 300 ppm of nitrogen oxides with an $NO_2/NO$ ratio of 1.2 was treated with an aqueous solution containing 10 g/liter of urea and 22 g/liter of $CaCl_2$. The percent removal of nitrogen oxides was 43.6%.

EXAMPLE XII

Following the procedure described in Example I, an exhaust gas containing 300 ppm of nitrogen oxides with an $NO_2/NO$ ratio of 1.2 was treated with an aqueous solution containing 100 g/liter of urea and 27 g/liter of $PBr_3$. The percent removal of nitrogen oxides was 55.5%.

EXAMPLE XIII

Following the procedure described in Example I, an exhaust gas containing 600 ppm of nitrogen oxides with an $NO_2/NO$ ratio of 1.2 was treated with an aqueous solution containing 10 g/liter of urea and 13.4 g/liter of $AlCl_3$. The percent removal of nitrogen oxides was 51.7%.

EXAMPLE XIV

Following the procedure described in Example I, an exhaust gas containing 300 ppm of nitrogen oxides with an $NO_2/NO$ ratio of 1.2 was treated with an aqueous solution containing 100 g/liter of urea and 13 g/liter of $MnCl_2$. The percent removal of nitrogen oxides was 40.4%.

EXAMPLE XV

Following the procedure described in Example I, an exhaust gas containing 635 ppm of nitrogen oxides with an $NO_2/NO$ ratio of 1.35 was treated with an aqueous solution containing 10 g/liter of urea, 21.6 g/liter of $FeBr_2$ and 50 g/liter of $H_2SO_4$. The percent removal of nitrogen oxides was 69.8%.

EXAMPLE XVI

Following the procedure described in Example I, an exhaust gas containing 330 ppm of nitrogen oxides with an $NO_2/NO$ ratio of 1.3 was treated with an aqueous solution containing 1 g/liter of urea, 22.4 g/liter of $CuBr_2$ and 50 g/liter of $H_2SO_4$. The percent removal of nitrogen oxides was 58.2 %.

EXAMPLE XVII

Following the procedure described in Example I, an exhaust gas containing 330 ppm of nitrogen oxides with an $NO_2/NO$ ratio of 1.3 was treated with an aqueous solution containing 50 g/liter of urea and 56 g/liter of $ZnBr_2$. The percent removal of nitrogen oxides was 62.0%.

EXAMPLE XVIII

Following the procedure described in Example I, an exhaust gas containing 300 ppm of nitrogen oxides with an $NO_2/NO$ ratio of 1.24 was treated with an aqueous solution containing 10 g/liter of urea and 61.5 g/liter of $CH_3COBr$. The percent removal of nitrogen oxides was 63.1%.

EXAMPLE XIX

Following the procedure described in Example I, an exhaust gas containing 300 ppm of nitrogen oxides with an $NO_2/NO$ ratio of 1.24 was treated with an aqueous solution containing 10 g/liter of urea and 20.8 g/liter of $SOBr_2$. The percent removal of nitrogen oxides was 64.3%.

EXAMPLE XX

Following the procedure described in Example I, an exhaust gas containing 320 ppm of nitrogen oxides with an $NO_2/NO$ ratio of 1.22 was treated with an aqueous solution containing 10 g/liter of urea and 18.2 g/liter of $(C_2H_5)_3NHBr$. The percent removal of nitrogen oxides was 60.6%.

EXAMPLE XXI

Following the procedure described in Example I, an exhaust gas containing 300 ppm of nitrogen oxides with an $NO_2/NO$ ratio of 1.2 was treated with an aqueous solution containing 100 g/liter of urea and 2.4 g/liter of KBr. The percent removal of nitrogen oxides was 50.0%.

EXAMPLE XXII

Following the procedure described in Example I, an exhaust gas containing 300 ppm of nitrogen oxides with an $NO_2/NO$ ratio of 1.2 was treated with an aqueous solution containing 100 g/liter of urea and 6 g/liter of KBr. The percent removal of nitrogen oxides was 55.0%.

EXAMPLE XXIII

Following the procedure described in Example I, an exhaust gas containing 300 ppm of nitrogen oxides with an $NO_2/NO$ ratio of 1.0 was treated with an aqueous solution containing 10 g/liter of urea, 4 g/liter of HBr and 11.9 g/liter of KBr. The percent removal of nitrogen oxides was 59.3%.

For comparison purposes, the above procedure was repeated except that the treating liquid was replaced by an acidic aqueous solution without containing 11.9 g/liter of KBr. The result was 49.0% removal of nitrogen oxides.

EXAMPLE XXIV

Following the procedure described in Example I, an exhaust gas containing 300 ppm of nitrogen oxides with an $NO_2/NO$ ratio of 1.0 was treated with an aqueous solution containing 10 g/liter of urea, 2 g/liter of HCl and 5.8 g/liter of NaCl. The percent removal of nitrogen oxides was 41.3%.

The above procedure was repeated except that the treating liquid was replaced by an aqueous solution containing 11.9 g/liter of KBr instead of 5.8 g/liter of NaCl above.

The percent removal of nitrogen oxides obtained 58.0%.

For comparison purposes, the above procedure was repeated except that the treating liquid was replaced by an aqueous solution without containing either NaCl or KBr above. The percent removal of nitrogen oxides was 36.1%.

EXAMPLE XXV

Following the procedure described in Example I, an exhaust gas containing 300 ppm of nitrogen oxides with an $NO_2/NO$ ratio of 1.0 was treated with an aqueous solution containing 10 g/liter of urea, 2 g/liter of HBr, 1 g/liter of HCl and 11.9 g/liter of KBr. The percent removal of nitrogen oxides was 59.1%.

For comparison purposes, the above procedure was repeated except that the treating liquid was replaced by an acidic aqueous solution without containing 11.9 g/liter of KBr above. The result was 44.4% removal of nitrogen oxides.

EXAMPLE XXVI

Following the procedure described Example I, an exhaust gas containing 300 ppm of nitrogen oxides with an $NO_2/NO$ ratio of 1.0 was treated with an aqueoue solution containing 10 g/liter of urea, 2.5 g/liter of $H_2SO_4$ and 18 g/liter of KBr. The percent removal of nitrogen oxides was 59.2%.

For comparison purposes, the above procedure was repeated except that the treating liquid was replaced by an acidic aqueous solution without containing 18 g/liter of KBr. The result was 39.0% removal of nitrogen oxides.

Althought the invention has been described in conjunction with the above description of preferred embodiments, it is understood that it is not limited thereto, but instead includes all those embodiments within the scope and spirit of the appended claims.

What is claimed is:

1. A method of treating exhaust gas containing nitrogen oxides, comprising the steps of forming a neutral aqueous solution containing urea and a catalyst for the removal of said nitrogen oxides from said exhaust gas, said catalyst being a catalytic amount of at least one halogen ion selected from the group consisting of bromine and chlorine ions, and contacting said neutral aqueous solution with exhaust gas containing nitrogen oxides, said process being carried out at a temperature of between about ambient temperature and the boiling point of the solution.

2. The method of claim 1 wherein said neutral aqueous solution contains about 0.01 to about 30% by weight of urea and at least about 0.01 gram ion/liter of said halogen ion.

3. The method of claim 1 wherein said halogen ion is bromine ion.

4. A method of treating exhaust gas containing nitrogen oxides in an $NO_2/NO$ ratio of less than about 1, comprising partially oxidizing an exhaust gas containing nitrogen oxides in an $NO_2/NO$ ratio of less than about 1 to increase the $NO_2/NO$ ratio to about 1, forming a neutral aqueous solution containing urea and a catalyst for the removal of said nitrogen oxides from said exhaust gas, said catalyst being a catalytic amount of at least one halogen ion selected from the group consisting of bromine and chlorine ions, and contacting the partially oxidized gas with said neutral aqueous solution, said process being carried out at a temperature of between about ambient temperature and the boiling point of the solution.

5. The method of claim 4 wherein said neutral aqueous solution contains about 0.01 to about 30% by weight of urea and at least about 0.01 gram ion/liter of said halogen ion.

6. The method of claim 4 wherein said halogen ion is bromine ion.

7. A method of treating exhaust gas resulting from the combustion of petroleum fuels or fossil fuels and containing from about 10 to 1,000 ppm of nitrogen oxides, comprising adding to an aqueous solution of urea acidified with a strong mineral acid, a neutral salt containing chlorine or bromine ion, which will not substantially hydrolyze in said solution, in an amount more than equivalent to said strong mineral acid, thereby forming an aqueous solution containing urea, mineral acids, including hydrochloric acid or hydrobromic acid, and a catalytic amount of chlorine ion or bromine ion other than the chlorine ion or bromine ion forming said hydrochloric acid or hydrobromic acid, and contacting the resultant solution with said exhaust gas, said process being carried out at a temperature of between about ambient temperature and the boiling point of the solution.

8. The method of claim 7 wherein said acidic aqueous solution contains about 0.01 to about 30% by weight of urea and at least about 0.01 gram ion/liter of chlorine or bromine ion.

9. The method of claim 7 wherein said neutral salt contains bromine ion.

10. The method of claim 7 wherein said neutral salt contains chlorine ion.

11. A method of treating exhaust gas containing nitrogen oxides in an $NO_2/NO$ ratio of less than about 1, comprising partially oxidizing said gas to increase the $NO_2/NO$ ratio to about 1, adding to an aqueous solution of urea acidified with a strong mineral acid, a neutral salt containing chlorine or bromine ion, which will not substantially hydrolyze in said solution, in an amount more than equivalent to said strong mineral acid, thereby forming an aqueous solution containing urea, mineral acids, including hydrochloric acid or hydrobromic acid, and a catalytic amount of chlorine ion or bromine ion other than the chlorine ion or bromine ion forming said hydrochloric acid or hydrobromic acid, and contacting the resultant solution with said partially oxidized gas, said process being carried out at a temperature of between about ambient temperature and the boiling point of the solution.

12. The method of claim 1 wherein said acidic aqueous solution contains about 0.01 to about 30% by weight of urea and at least about 0.01 gram ion/liter of said chlorine or bromine ion.